US009170581B2

(12) United States Patent
Bell et al.

(10) Patent No.: US 9,170,581 B2
(45) Date of Patent: Oct. 27, 2015

(54) INDUSTRIAL VEHICLES WITH OVERHEAD LIGHT BASED LOCALIZATION

(71) Applicant: Crown Equipment Limited, East Tamaki, Auckland (NZ)

(72) Inventors: Mark Bell, Auckland (NZ); Kashyap Chandrasekar, Auckland (NZ); Lucas B. Waltz, Coldwater, OH (US); Jacob Thomson, Auckland (NZ)

(73) Assignee: Crown Equipment Limited, Auckland (NZ)

( * ) Notice: Subject to any disclaimer, the term of this patent is extended or adjusted under 35 U.S.C. 154(b) by 0 days.

(21) Appl. No.: 14/499,721

(22) Filed: Sep. 29, 2014

(65) Prior Publication Data

US 2015/0094900 A1 Apr. 2, 2015

Related U.S. Application Data

(60) Provisional application No. 61/884,388, filed on Sep. 30, 2013, provisional application No. 61/897,287, filed on Oct. 30, 2013.

(51) Int. Cl.
| | |
|---|---|
| *G05D 1/00* | (2006.01) |
| *G05D 1/02* | (2006.01) |
| *G06T 7/00* | (2006.01) |

(52) U.S. Cl.
CPC ............ *G05D 1/0246* (2013.01); *G06T 7/0085* (2013.01); *G06T 2207/20061* (2013.01); *G06T 2207/30172* (2013.01); *G06T 2207/30252* (2013.01)

(58) Field of Classification Search
CPC combination set(s) only.
See application file for complete search history.

(56) References Cited

U.S. PATENT DOCUMENTS

| | | | |
|---|---|---|---|
| 4,773,018 | A | 9/1988 | Lundstroem |
| 4,790,402 | A | 12/1988 | Field et al. |
| 4,933,864 | A | 6/1990 | Evans, Jr. et al. |

(Continued)

FOREIGN PATENT DOCUMENTS

| | | |
|---|---|---|
| CN | 102135429 A | 7/2011 |
| CN | 103020632 A | 4/2013 |

(Continued)

OTHER PUBLICATIONS

Facchinetti et al., "Using and Learning Vision-based Self-positioning for Autonomous Robot Navigation", ICARCV, 1994, wwwa.unine.ch.

(Continued)

*Primary Examiner* — Thomas Tarcza
*Assistant Examiner* — Edward Pipala
(74) *Attorney, Agent, or Firm* — Dinsmore & Shohl LLP

(57) ABSTRACT

According to the embodiments described herein, a method for environmental based localization may include capturing an input image of a ceiling comprising a plurality of skylights. Features can be extracted from the input image. The features can be grouped into a plurality of feature groups such that each of the feature groups is associated with one of the skylights. Line segments can be extracted from the features of each feature group, automatically, with one or more processors executing a feature extraction algorithm on each feature group separately. At least two selected lines of the line segments of each feature groups can be selected. A centerline for each of the feature groups can be determined based at least in part upon the two selected lines. The center line of each of the feature groups can be associated with one of the skylights.

20 Claims, 9 Drawing Sheets

(56) References Cited

U.S. PATENT DOCUMENTS

| | | | |
|---|---|---|---|
| 4,947,094 | A | 8/1990 | Dyer et al. |
| 5,155,684 | A | 10/1992 | Burke et al. |
| 5,359,666 | A | 10/1994 | Nakayama et al. |
| 5,922,036 | A | 7/1999 | Yasui et al. |
| 6,459,955 | B1 | 10/2002 | Bartsch et al. |
| 6,732,826 | B2 | 5/2004 | Song et al. |
| 7,440,636 | B2 | 10/2008 | Bober et al. |
| 8,040,351 | B1* | 10/2011 | Diard .................. 345/426 |
| 8,160,744 | B2 | 4/2012 | Nagasaka et al. |
| 8,467,902 | B2 | 6/2013 | Myeong et al. |
| 2005/0271248 | A1* | 12/2005 | Teku et al. .................. 382/103 |
| 2010/0329513 | A1 | 12/2010 | Klefenz |
| 2012/0051595 | A1 | 3/2012 | Lee et al. |

FOREIGN PATENT DOCUMENTS

| | | |
|---|---|---|
| DE | 4429016 A1 | 2/1996 |
| DE | 102009004854 A1 | 7/2010 |
| DE | 102010008957 A1 | 8/2011 |
| DE | 102011115354 A1 | 4/2013 |
| EP | 0363339 A2 | 4/1990 |
| EP | 0364353 A1 | 4/1990 |
| EP | 0366350 A2 | 5/1990 |
| EP | 0 740 163 A2 | 10/1996 |
| EP | 2154478 A1 | 2/2010 |
| EP | 2385435 A1 | 11/2011 |
| EP | 2423772 A1 | 2/2012 |
| EP | 2549408 A1 | 1/2013 |
| GB | 2376537 A | 12/2002 |
| JP | H05257527 A | 10/1993 |
| JP | H06 243251 A | 9/1994 |
| JP | H07248822 A | 9/1995 |
| JP | 2004133567 A | 4/2004 |
| JP | 2012164229 A | 8/2012 |
| KR | 20080101131 A | 11/2008 |
| KR | 100877071 B1 | 1/2009 |
| KR | 20110004719 A | 1/2011 |
| KR | 20110009547 A | 1/2011 |
| KR | 20110033741 A | 3/2011 |
| KR | 20110049567 A | 5/2011 |
| KR | 20110054614 A | 5/2011 |
| KR | 20120088322 A | 8/2012 |
| KR | 20130022994 A | 3/2013 |
| KR | 20130043305 A | 4/2013 |
| WO | 0162446 A2 | 8/2001 |
| WO | 2008080606 A1 | 7/2008 |
| WO | 2010006352 A1 | 1/2010 |
| WO | 2013032192 A2 | 3/2013 |

OTHER PUBLICATIONS

Katz et al., "A Guidance Technique for an Automated Guided Vehicle", Int J Adv Manuf Technol, vol. 7, pp. 198-202, 1992.

King et al., "HelpMate autonomous mobile robot navigation system", Proc. SPIE 1388, Mobile Robots V. 190, Conference vol. 1388, Mar. 1, 1991 (Abstract).

Leonard et al., "Mobile Robot Localization by Tracking Geometric Beacons", IEEE Transactions on Robotics and Automation, vol. 7, No. 3, Jun. 1991.

Mesaki et al., "A New Mobile Robot Guidance System Using Optical Reflectors", Proceedings of the 1992 IEEE/RSJ International Conference on Intelligent Robotics and Systems, Jul. 7-10, 1992 (Abstract).

Niizuma et al., "Action-oriented sensor data integration and its application to control of an autonomous vehicle", IEEE Multisensor Fusion and Integration for Intelligent Systems, Oct. 2-5, 1994 (Abstract).

Takeda et al., "Automated vehicle guidance using spotmark", IEEE International Conference on Robotics and Automation, vol. 3, Apr. 1996 (Abstract).

International Search Report and Written Opinion dated Dec. 22, 2014 pertaining to International application No. PCT/US2014/058239.

Cui, S.Y. et al, Building Detection and Recognition from High Resolution Remotely Sensed Imagery, http://www.isprs.org/proceedings/XXXVII/congress/3b_pdf/79.pdf; Jul. 11, 2008; pp. 411-416.

* cited by examiner

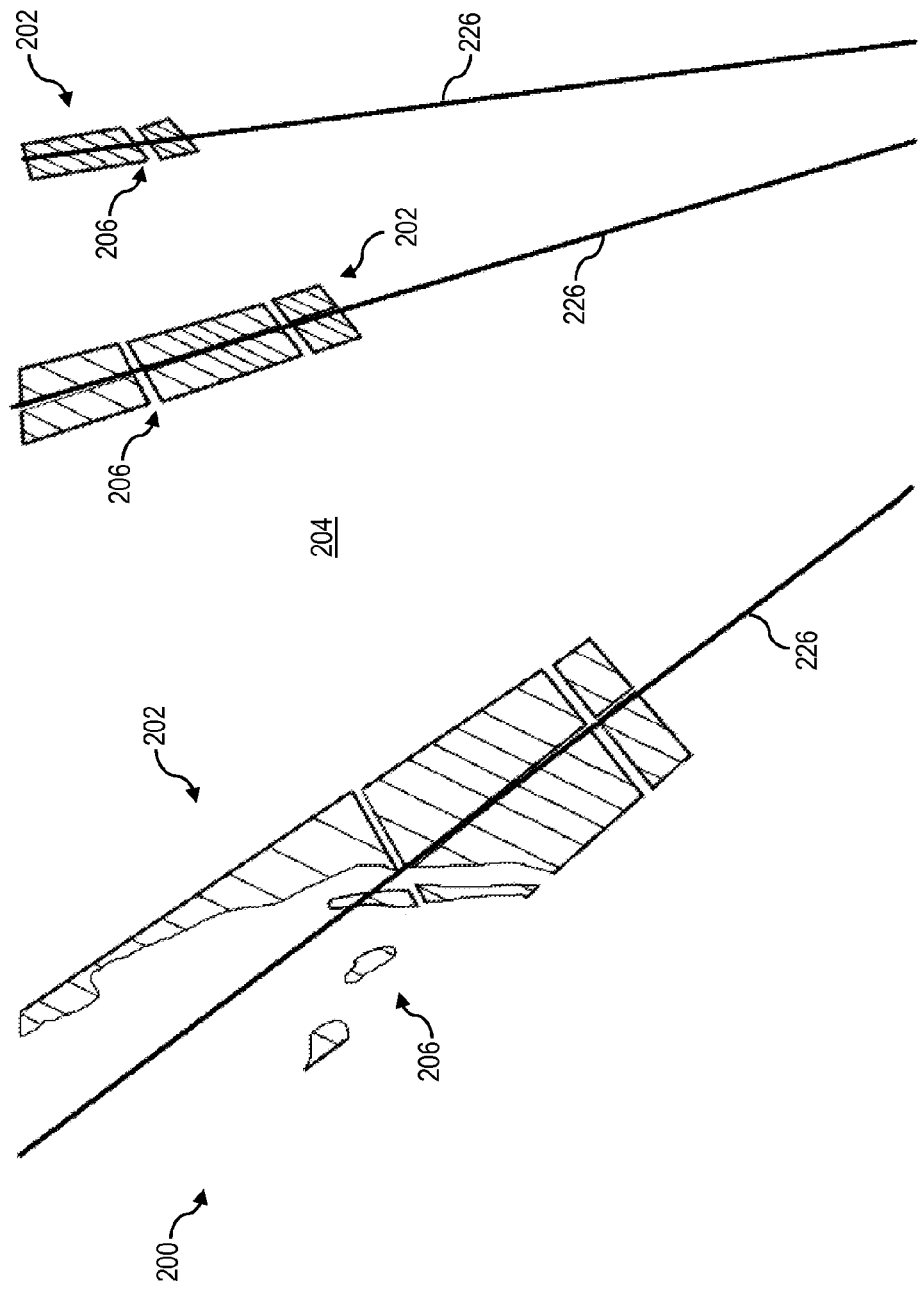

INDUSTRIAL VEHICLES WITH OVERHEAD LIGHT BASED LOCALIZATION

CROSS-REFERENCE TO RELATED APPLICATIONS

This application claims the benefit of U.S. Provisional Application No. 61/884,388 filed Sep. 30, 2013 and U.S. Provisional Application No. 61/897,287 filed Oct. 30, 2013.

BACKGROUND

The present specification generally relates to systems and methods for providing features of ceiling lights and, more specifically, to systems and methods for providing centerline features of ceiling lights.

In order to move items about an industrial environment, workers often utilize industrial vehicles, including for example, forklift trucks, hand and motor driven pallet trucks, and/or other materials handling vehicles. The industrial vehicles can be configured as an automated guided vehicle or a manually guided vehicle that navigates through the environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle. The sensors can be configured to detect objects in the environment and the localization can be dependent upon features extracted from such detected objects.

SUMMARY

In one embodiment, an industrial vehicle may include a camera and one or more processors that are communicatively coupled. The camera can be mounted to the industrial vehicle and focused to a ceiling of a warehouse. The camera can capture an input image of ceiling lights of the ceiling of the warehouse. The one or more processors execute machine readable instructions to associate raw features of the ceiling lights of the input image with one or more feature groups. A Hough transform can be executed to transform the raw features of the one or more feature groups into line segments associated with the one or more feature groups. A convex hull of the raw features of the one or more feature groups can be determined. The line segments of the one or more feature groups and the convex hull can be compared in Hough space. The line segments of the one or more feature groups that are outside of a threshold of similarity to the convex hull of the raw features of the one or more feature groups can be discarded. A preferred set of lines can be selected for the one or more feature groups from the line segments of the one or more feature groups. A centerline of the one or more feature groups can be determined from the preferred set of lines. The centerline of the one or more feature groups can be associated with one of the ceiling lights of the input image. The industrial vehicle can be navigated through the warehouse utilizing the centerline of the one or more feature groups.

In another embodiment, an industrial vehicle may include a camera and one or more processors that are communicatively coupled. The camera can be mounted to the industrial vehicle and focused to a ceiling of a warehouse. The camera can capture an input image of a skylight of the ceiling of the warehouse. The one or more processors execute machine readable instructions to extract raw feature contours from the skylight of the input image of the ceiling. The raw feature contours can be grouped into a feature group. A Hough transform can be executed to transform the raw feature contours of the feature group into line segments associated with the feature group. A convex hull of the raw feature contours of the feature group can be determined. The line segments of the feature group and the convex hull can be compared in Hough space. The line segments of the feature group that are outside of a threshold of similarity to the convex hull of the raw feature contours of the feature group can be discarded. A preferred set of lines can be selected for the feature group from the line segments of the feature group. A centerline of the feature group can be determined from the preferred set of lines of the feature group. A pose of the industrial vehicle, a position of the industrial vehicle, or both can be determined based upon the centerline. The industrial vehicle can be navigated through the warehouse utilizing the pose, the position, or both.

In a further embodiment, a method for navigating an industrial vehicle can be performed. An input image of a skylight and a substantially circular light of a ceiling of a warehouse can be captured. The input image can be captured with a camera coupled to an industrial vehicle. Raw features can be extracted from the skylight of the input image. A convex hull of the raw features can be determined automatically, with one or more processors. A preferred set of lines can be selected from the raw features utilizing the convex hull of the raw features. The substantially circular light of the input image can be transformed automatically, with the one or more processors, into a point feature. A centerline of the skylight can be determined from the preferred set of lines. A pose of the industrial vehicle, a position of the industrial vehicle, or both can be determined based upon the centerline and the point feature. The industrial vehicle can be navigated through the warehouse utilizing the pose, the position, or both.

In still another embodiment, a system for navigating an industrial vehicle through a building structure can be provided. The system may include a camera capable of being mounted to the industrial vehicle and being configured to capture an overhead image comprising overhead lighting within the building structure, and one or more processors communicatively coupled to the camera. The camera can capture an input image including overhead lighting within the building structure. The one or more processors execute machine readable instructions to associate raw features of the overhead illuminations of the input image with one or more feature groups. A Hough transform can be executed to transform the raw features of the one or more feature groups into line segments associated with the one or more feature groups. A convex hull of the raw features of the one or more feature groups can be determined. The line segments of the one or more feature groups and the convex hull can be compared in Hough space. The line segments of the one or more feature groups that are outside of a threshold of similarity to the convex hull of the raw features of the one or more feature groups can be discarded. A preferred set of lines can be selected for the one or more feature groups from the line segments of the one or more feature groups. A centerline of the one or more feature groups can be determined from the preferred set of lines. The centerline of the one or more feature groups can be associated with one of the overhead illuminations of the input image. The industrial vehicle can be navigated through the warehouse utilizing the centerline of the one or more feature groups.

According to any of the industrial vehicles, the methods, and the systems herein, the convex hull can include hull line segments, and the line segments of the one or more feature groups are compared to the hull line segments.

According to any of the industrial vehicles, the methods, and the systems herein, the one or more processors can execute the machine readable instructions to convert the hull line segments into Hough space coordinates, wherein the hull line segments are infinite lines represented by coordinates $\rho$ and $\theta$.

According to any of the industrial vehicles, the methods, and the systems herein, the one or more processors can execute the machine readable instructions to rank the line segments of the one or more feature groups in order of strength. A first edge line can be selected from the line segments of the preferred set of lines. The first edge line can be a highest ranked line of the line segments of the preferred set of lines. Alternatively or additionally, the first edge line can be represented by coordinates $\rho$ and $\theta$. Alternatively or additionally, the one or more processors can execute the machine readable instructions to select a second edge line from the line segments of the preferred set of lines. The second edge line can be selected based upon similarity to the $\theta$ of the first edge line. Alternatively or additionally, the second edge line and the first edge line are separated by a distance threshold. Alternatively or additionally, the one or more processors can execute the machine readable instructions to search the line segments of the preferred set of lines from a high rank to a low rank to select the second edge line. Alternatively or additionally, the one or more processors can execute the machine readable instructions to find a vanishing point where the second edge line and the first edge line converge. A line of bisection of the second edge line and the first edge line can be calculated. The centerline can be calculated based upon the line of bisection.

According to any of the industrial vehicles, the methods, and the systems herein, each of the one or more feature groups of the raw features can be transformed separately into the line segments.

According to any of the industrial vehicles, the methods, and the systems herein, the input image can be underexposed to highlight the overhead illuminations.

According to any of the industrial vehicles, the methods, and the systems herein, the one or more processors can execute the machine readable instructions to extract raw feature contours from the skylights. The raw features can include the raw feature contours. The raw feature contours can be classified as belonging to a skylights class. The raw feature contours can be grouped into the one or more feature groups. The one or more feature groups can include one group per unique skylight of the skylights. Each of the one group can include the raw feature contours of the unique skylight.

According to any of the industrial vehicles, the methods, and the systems herein, the overhead lights can include round lights and merged lights. The one or more processors can execute the machine readable instructions to extract features from the round lights and the merged lights. The raw features can include the features from the round lights and the merged lights. The features from the round lights and the merged lights can be classified into a standard lights class and a merged lights class. Alternatively or additionally, the raw features can include unwanted features. The one or more processors can execute the machine readable instructions to classify the unwanted features as noise. Alternatively or additionally, the raw feature contours can be grouped into the one or more feature groups based upon relative proximity. The one or more processors can execute the machine readable instructions to calculate a minimum bounding rectangle for each of the raw feature contours. The relative proximity can be calculated based upon inter-feature distances of the minimum bounding rectangle for each of the raw feature contours.

According to any of the industrial vehicles, the methods, and the systems herein, a memory can be communicatively coupled to the one or more processors, the camera or both.

According to any of the industrial vehicles, the methods, and the systems herein, the industrial vehicle can be adapted for automatic and/or manual navigation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9 schematically depicts centerline features overlaid upon the input image of FIG. 3 according to one or more embodiments shown and described herein.

DETAILED DESCRIPTION

The embodiments described herein generally relate to Environmental Based Localization techniques (EBL) for extracting features from overhead lighting including, but not limited to, skylights. The EBL may be used to localize and/or navigate an industrial vehicle through a building structure, such as a warehouse. Suitably, the overhead lighting may be mounted in or on a ceiling of a building. However, in some embodiments the lighting may also or alternatively be suspended from a ceiling or wall via suitable structure. In some embodiments, a camera can be mounted to an industrial vehicle (e.g., automated guided vehicle or a manually guided vehicle) that navigates through a warehouse. The input image can be any image captured from the camera prior to extracting features from the image.

Figure 1:
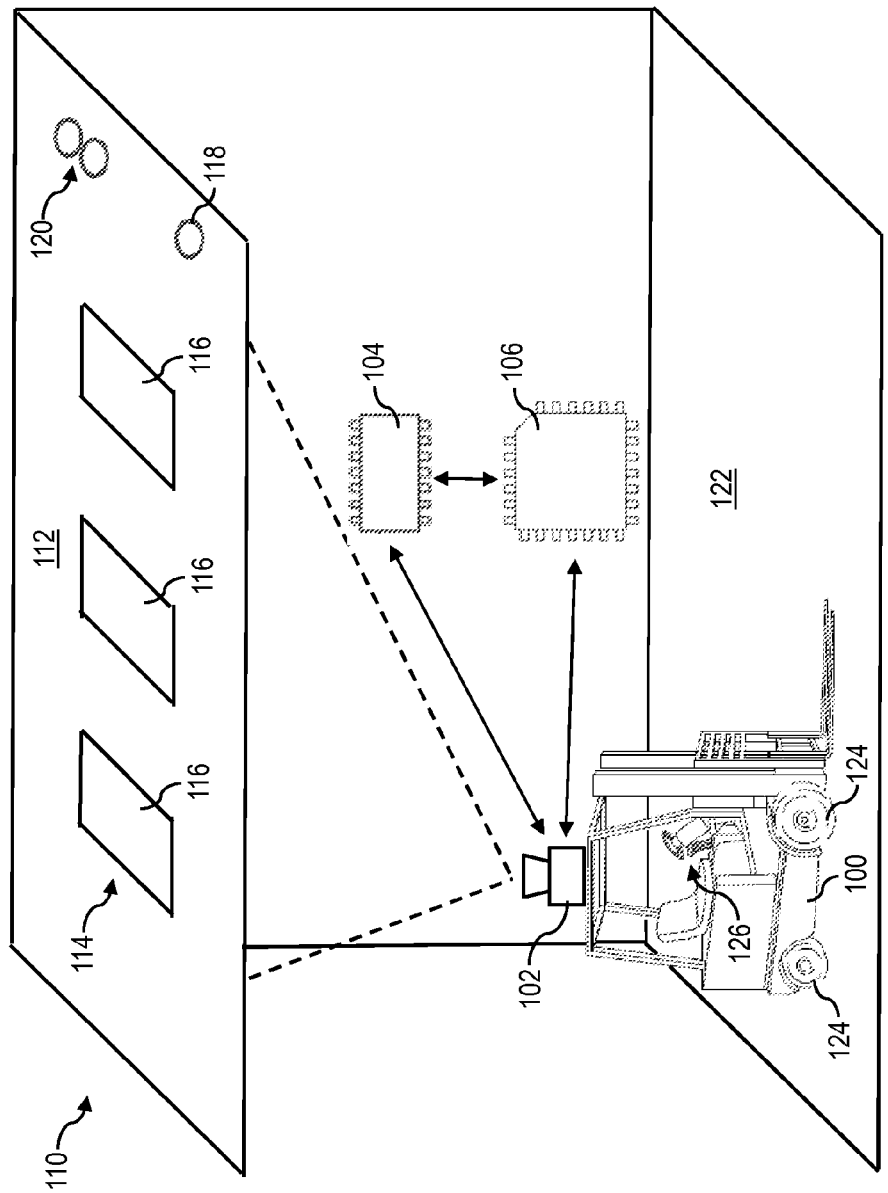
FIG. 1 depicts a vehicle for environmental based localization according to one or more embodiments shown and described herein.

Referring now to FIG. 1, a vehicle 100 can be configured to navigate through a warehouse 110. The vehicle 100 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate a surface 122 of the warehouse 110 along a desired path. Accordingly, the vehicle 100 can be directed forwards and backwards by rotation of one or more wheels 124. Additionally, the vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the vehicle 100 such as, for example, switches, buttons, levers, handles, pedals, input/output device, or the like. It is noted that the term "navigate" as used herein can mean controlling the movement of a vehicle from one place to another.

The vehicle 100 can further comprise a camera 102 for capturing overhead images. The camera 102 can be any device capable of capturing the visual appearance of an object and transforming the visual appearance into an image. Accordingly, the camera 102 can comprise an image sensor such as, for example, a charge coupled device, complementary metal-oxide-semiconductor sensor, or functional equivalents thereof. In some embodiments, the vehicle 100 can be located within the warehouse 110 and be configured to capture overhead images of the ceiling 112 of the warehouse 110. In order to capture overhead images, the camera 102 can be mounted to the vehicle 100 and focused to the ceiling 112. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing overhead objects.

The ceiling 112 of the warehouse 110 can comprise overhead lights such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above. As used herein, the term "skylight" can mean an aperture in a ceiling or roof fitted with a substantially light transmissive medium for admitting daylight, such as, for example, air, glass, plastic or the like. While skylights can come in a variety of shapes and sizes, the skylights described herein can include "standard" long, substantially rectangular skylights that may or may not be split by girders or crossbars into a series of panels. Alternatively, skylights can comprise smaller, discrete skylights of rectangular or circular shape that are similar in size to a bedroom window, i.e., about 30 inches by about 60 inches (about 73 cm by about 146 cm). Alternatively or additionally, the ceiling lights 114 can comprise substantially circular lights such as, for example, round lights 118, merged lights 120, which can comprise a plurality of adjacent round lights that appear to be a single object, or the like. Thus, overhead lights or 'ceiling lights' include sources of natural (e.g. sunlight) and artificial (e.g. electrically powered) light.

The embodiments described herein can comprise one or more processors 104 communicatively coupled to the camera 102. The one or more processors 104 can execute machine readable instructions to implement any of the methods or functions described herein automatically. Memory 106 for storing machine readable instructions can be communicatively coupled to the one or more processors 104, the camera 102, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the camera 102. Alternatively or additionally, each of the one or more processors 104 and the memory 106 can be integral with the vehicle 100. Moreover, each of the one or more processors 104 and the memory 106 can be separated from the vehicle 100 and the camera 102. For example, a server or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the vehicle 100 can be navigated automatically by the one or more processors 104 executing the machine readable instructions. In some embodiments, the location of the vehicle can be monitored by the EBL as the vehicle 100 is navigated.

For example, the vehicle 100 can automatically navigate along the surface 122 of the warehouse 110 along a desired path to a desired position based upon a localized position of the vehicle 100. In some embodiments, the vehicle 100 can determine the localized position of the vehicle 100 with respect to the warehouse 110. The determination of the localized position of the vehicle 100 can be performed by comparing image data to map data. The map data can be stored locally in the memory 106, which can be updated periodically, or map data provided by a server or the like. Given the localized position and the desired position, a travel path can be determined for the vehicle 100. Once the travel path is known, the vehicle 100 can travel along the travel path to navigate the surface 122 of the warehouse 110. Specifically, the one or more processors 106 can execute machine readable instructions to perform EBL functions and operate the vehicle 100. In one embodiment, the one or more processors 106 can adjust the steering of the wheels 124 and control the throttle to cause the vehicle 100 to navigate the surface 122.

Figure 2:
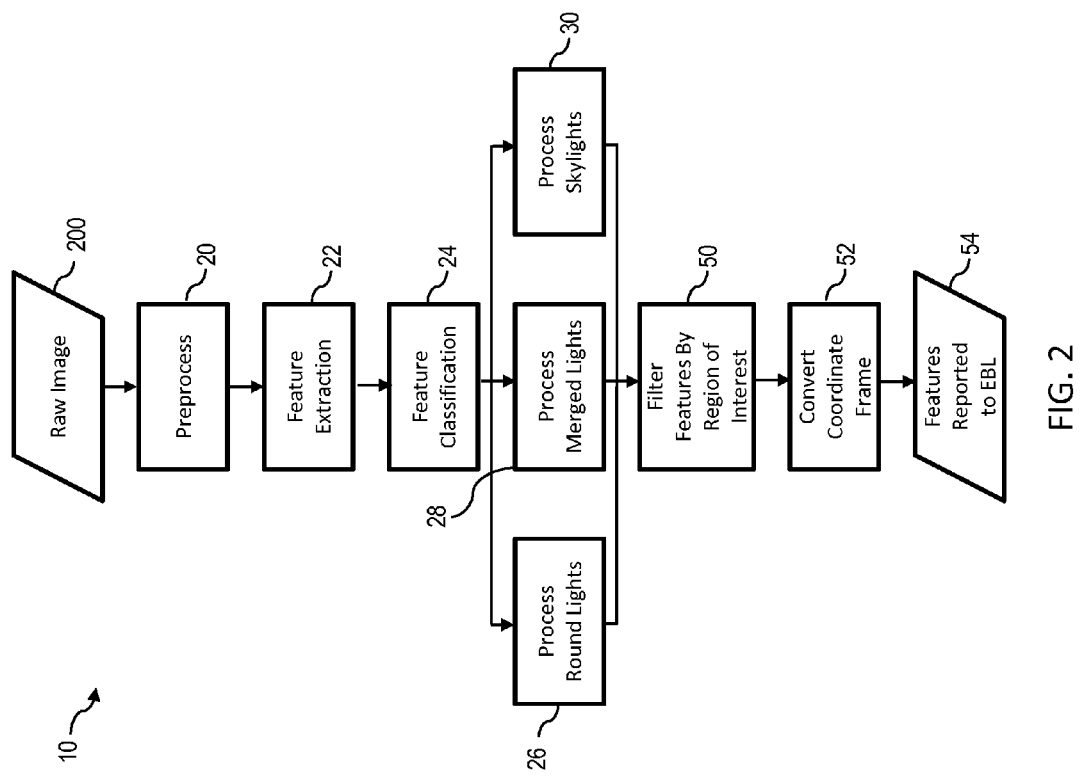
FIG. 2 depicts a flowchart of an exemplary algorithm for camera feature extraction/overhead lighting feature extraction for environmental based localization according to one or more embodiments shown and described herein.

Referring now to FIG. 2, a flow chart of a sequence of functions for a full Camera Feature Extraction (CFE) algorithm 10 is schematically depicted. It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

Figure 3:
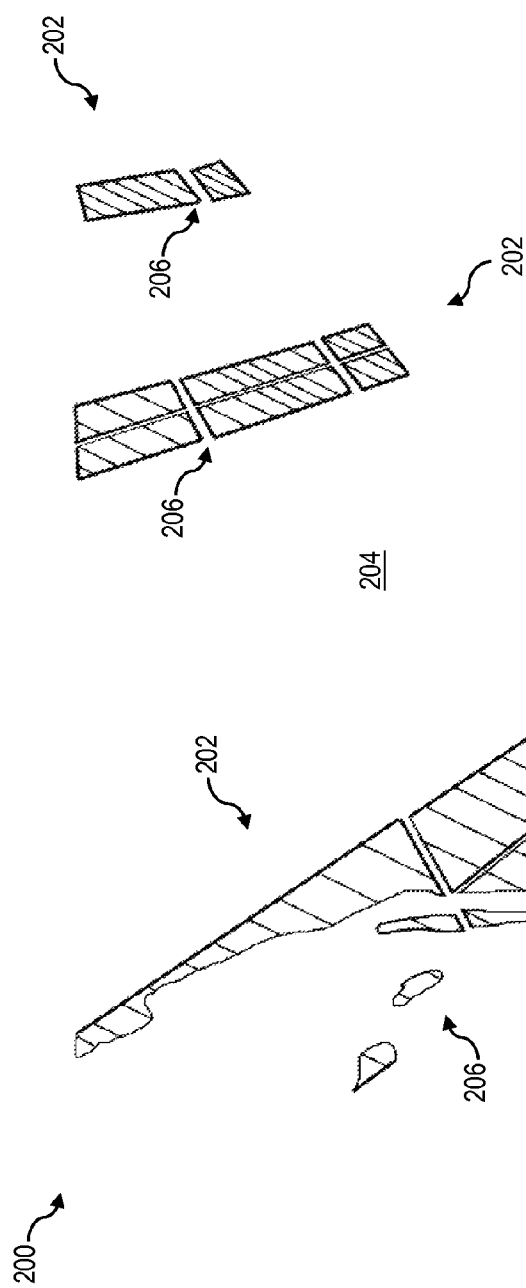
FIG. 3 schematically depicts a input image showing three skylights according to one or more embodiments shown and described herein.

Referring collectively to FIGS. 1-3, the CFE algorithm 10 can comprise a preprocess function 20 for processing the input image 200 of the ceiling 204 prior to executing further functions on the input image 200. The input image 200 is depicted as having captured a frame that includes skylights 202 corresponding to the skylights 116 of a warehouse 110. In some embodiments, the preprocess function 20 can comprise functions for the removal of lens distortion effects from the input image 200. Alternatively or additionally, the input image 200 can be captured by deliberately underexposing the input image 200 in order to highlight the ceiling lights 114, which can include skylights 116. It has been discovered that low exposure can aid in reducing reflections and other spurious artifacts, which can make the feature extraction processing more complicated and less reliable.

The CFE algorithm 10 can further comprise a feature extraction function 22 for extracting features from the input image 200 of the ceiling 204. The feature extraction function 22 can utilize one or more feature detection algorithms such as, for example, maximally stable extremal regions (MSER) algorithm, a thresholding step combined with Otsu's method to extract raw features (i.e. lights) from the image, or equivalent algorithms. Specifically, the extracted features from the input images 200 can be utilized by the localization process to determine the positions of ceiling lights 114 that are captured by the camera 102. For example, centroids can be extracted from round lighting features such as substantially circular shaped lights. Additionally, for smaller skylights the full extent of the smaller skylight can be captured within a single image frame. Accordingly, a centroid extraction function can be applied, as per substantially circular lights.

The CFE algorithm 10 can further comprise a feature classification function 24 for classifying the raw features 206 extracted from the input image 200 of the ceiling 204, by the feature extraction function 22, into multiple classifications. The feature classification function 24 can separate the raw features 206 into different classes in preparation for more specific processing. For example, merged lights can be differentiated from round lights by looking for objects with a longer major axis to minor axis ratio. Skylight panels can be differentiated from round lights based on size and circularity. Specifically, round lights generally form smaller and rounder blobs in the image than skylight panels. Sometimes smaller sections of skylights can appear broken up in an image in such a way that can lead to misclassification.

In the depicted embodiment, the raw features 206 can be classified into one of the following four classes: standard lights class (round lights), merged lights class, skylights class and noise class. The noise class label can be used to denote unwanted "false" features such as reflections. The raw features 206 classified as belonging to the noise class can be discarded after being classified by the feature classification function 24, i.e., not utilized by subsequent functions. Each of the other three classes can undergo separate processing to extract the desired feature information. As is explained in greater detail below, a point feature can be extracted from the raw features 206 of the standard lights class and the merged lights class, and a line feature can be extracted from the skylights class and then each of the extracted features can be published to the EBL.

Specifically, the process round lights function 26 can find centroids of the raw features 206 of the standard lights class. Alternatively or additionally, the process merged lights function 28 can split a pair of lights that appear as merged in the input image 200 and find two centroids. The process skylights function 30 can take all extracted components belonging to the skylights class, group into skylights and find centerlines, as is explained in greater detail below. The filter features by region of interest function 50 can remove features outside of a defined region of interest. Accordingly, any remaining features, such as reflections from a truck mast, can be removed. The convert coordinate frames function 52 can convert feature coordinates from an image processing frame (e.g., origin in top-left corner) to EBL frame (e.g., origin in center of image) before the features reported 54 are published to the EBL.

Figure 4:
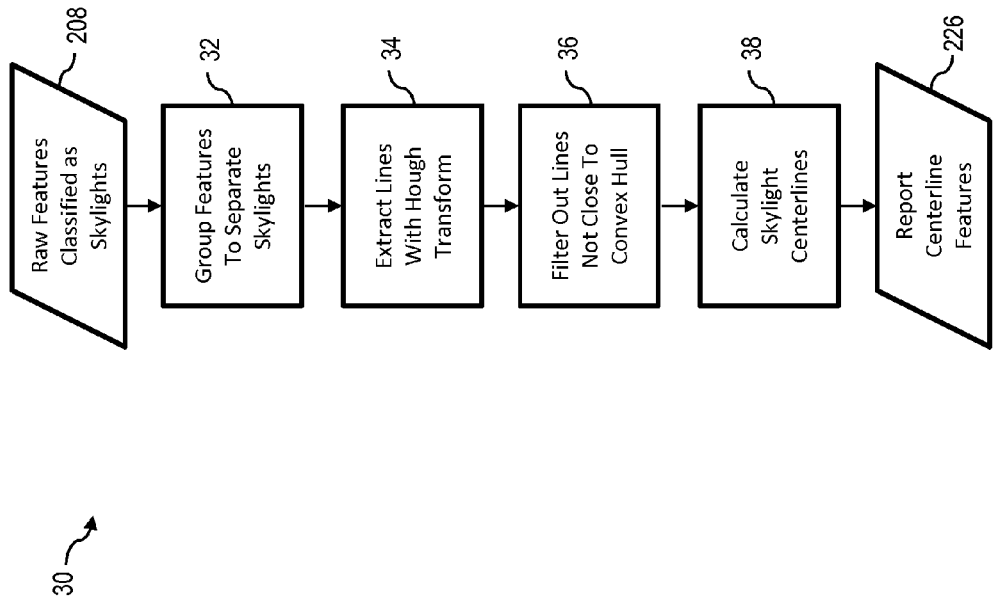
FIG. 4 depicts a flowchart of an exemplary algorithm for skylight extraction according to one or more embodiments shown and described herein.
Figure 5:
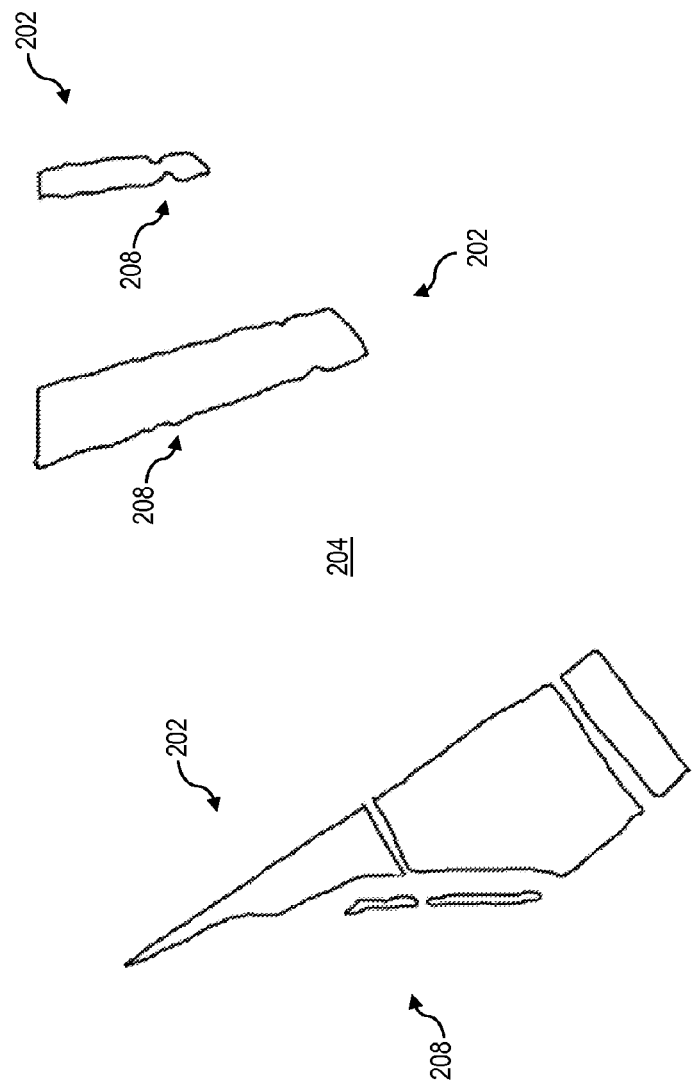
FIG. 5 schematically depicts raw feature contours of the three skylights of FIG. 3 according to one or more embodiments shown and described herein.

Referring collectively to FIGS. 3-5, a flow chart of a sequence of functions for the process skylights function 30 is schematically depicted. It is noted that, while the functions are enumerated and performed in a particular sequence in the depicted embodiment, the functions can be performed in an alternative order without departing from the scope of the present disclosure. It is furthermore noted that one or more of the functions can be omitted without departing from the scope of the embodiments described herein. Input to the process skylights function 30 can be raw feature contours 208, which can comprise the raw features 206 of the input image 200 that were classified as belonging to the skylights class. Output from the process skylights function 30 can be a set of centerline 226 features. In some embodiments, the centerlines 226 can be defined as coordinates in Hough space (i.e., polar coordinates). It is preferred to have one centerline 226 reported for every unique instance of a skylight 202 captured in the input image 200.

Figure 6:
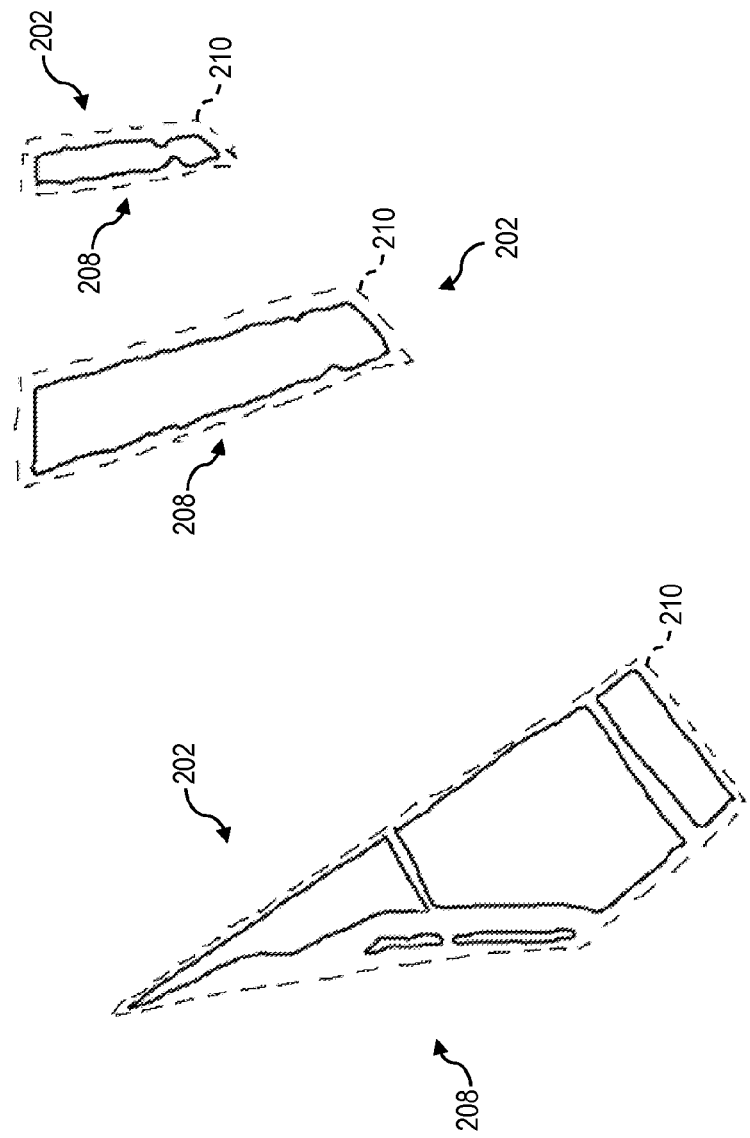
FIG. 6 schematically depicts the raw features of FIG. 5 grouped into separate groups corresponding to each skylight of FIG. 3 according to one or more embodiments shown and described herein.

Referring collectively to FIGS. 4 and 6, the process skylights function 30 can comprise a grouping function 32 for associating the raw feature contours 208 with a skylight 202. The grouping function can comprise any algorithm capable of repeatable association with raw feature contours 208 with its skylight 202. In one embodiment, a distance threshold can be utilized to group together the raw feature contours 208 based upon relative proximity. As a raw feature contour 208 may be a complicated shape, oriented minimum bounding rectangles of the raw feature contours 208 can be calculated first for each contour and inter-feature distances for grouping can be calculated from the minimum bounding rectangles.

Accordingly, the raw feature contours 208 can be grouped to separate the raw feature contours 208 based upon their associated skylight. Applicants have discovered that variation due to natural illumination can cause inconsistency in the images, i.e., panels may not break up in a consistent manner. Accordingly, the centerlines 226 can be determined based upon "complete" skylights, as represented by the raw feature contours 208 that are grouped, and not features for each individual panel. In some embodiments, the raw feature contours 208 can be grouped into feature groups 210 of one group per skylight 202. Specifically, since the input image 200 (FIG. 3) comprises three skylights 202, the raw feature contours can be grouped into three of the feature groups 210 that have been located by the grouping function 32.

Figure 7:
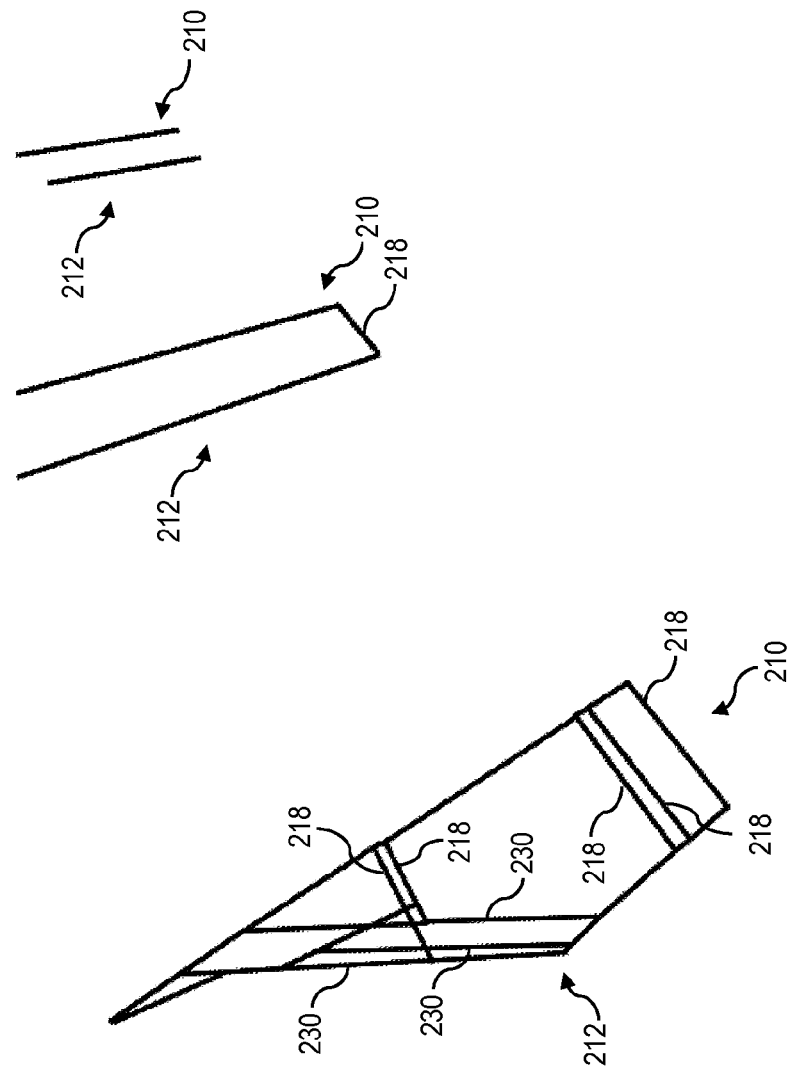
FIG. 7 schematically depicts line segments extracted from the groups of raw features of FIG. 5 using a feature extraction technique according to one or more embodiments shown and described herein.

Referring collectively to FIGS. 4 and 7, the process skylights function 30 can comprise a feature extraction function 34 for extracting line segments 212 from the raw feature contours 208. The line segments 212 can be associated with each of the feature groups 210 of raw feature contours 208. In some embodiments, feature extraction function 34 can comprise a feature extraction algorithm that can transform each of the feature groups 210 of raw feature contours 208 separately, i.e., one group at a time, into line segments 212 associated with the feature group 210 that the line segments 212 are extracted from. In some embodiments, a Hough transform can be performed on each of the feature groups 210 of raw feature contours 208 separately to identify the line segments 212 associated with each skylight 202. Each of the line segments 212 can be represented by two end points. When the line segments 212 are returned from the Hough transform, the line segments 212 can be ranked in order of strength, i.e., the more pixels in a line or the longer the line, the higher the line will be ranked in the Hough transform. It has been discovered that, due to the effects of perspective distortion and occlusions, the higher ranked of the line segments 212 may not correspond to the "correct" edge lines. For example, the higher ranked of the line segments 212 may be the perpendicular intersecting lines 218 arising from the girders between panels. In order to increase the likelihood of extracting the correct centerlines, a filtering function 36 can be utilized to filter out some of the non-desirable lines that were returned from the transform.

Figure 8:
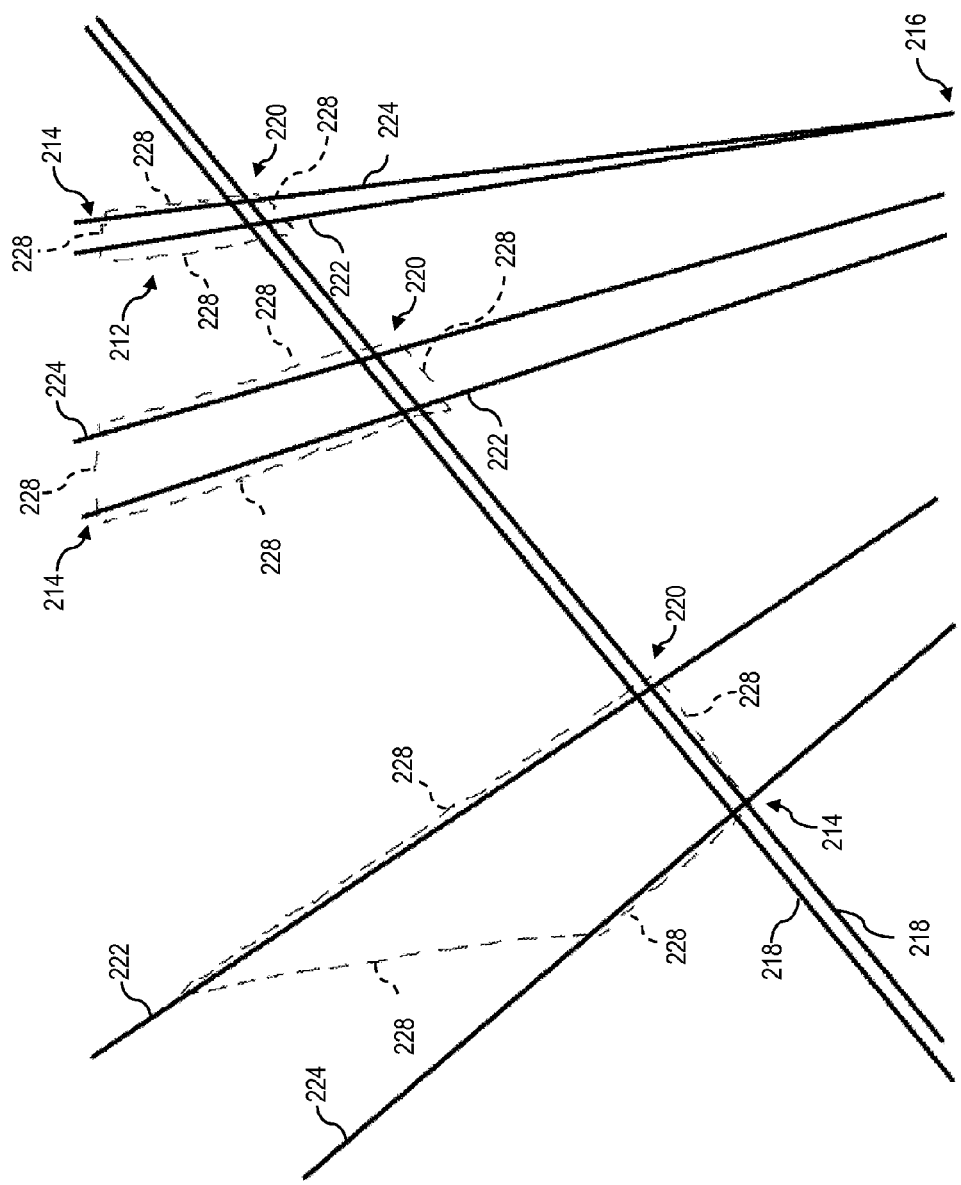
FIG. 8 schematically depicts selected line segments from FIG. 7 converted to "infinite" lines according to one or more embodiments shown and described herein.

Referring collectively to FIGS. 4, 6 and 8, the process skylights function 30 can comprise a filtering function 36 for selecting a preferred set of lines 214 from the line segments 212 of the feature groups 210. For example, after determining the feature groups 210 of line segments 212, the preferred set of lines 214 can be selected using a computational geometry algorithm such as, for example, algorithms for solving static problems or the like. In one embodiment, a convex hull algorithm can be utilized to select the preferred set of lines 214. It has been discovered that the use of convex hull algorithms in combination with Hough transforms can significantly improve the ability of the CFE algorithm 10 (FIG. 2) to isolate the "correct" edge lines for use in determining centerline features. Accordingly, the accuracy of centerline determination and any localization using centerline features can be improved.

In some embodiments, the convex hull 220 of the feature groups 210 of raw feature contours 208 (e.g., a skylight group of end points, or the like) can be found. The convex hull 220 can be a convex set that contains the raw feature contours 208 such as, for example, the global minimum convex set or local minimum convex set as determined by a convex hull algorithm. The convex hull 220 of the feature groups 210 of raw feature contours 208 can comprise an ordered list of points, which can be referred to as the convex hull points A, B, C, D. In some embodiments, the convex hull points can be iterated through to determine hull line segments 228 that make up the convex hull 220, i.e., hull point A and hull point B can make a hull line segment 228, hull point B and hull point C can make a line segment, hull point C and hull point D can make a hull line segment 228, hull point D and hull point A can make a hull line segment 228, and so on. The hull line segments 228 can be converted into Hough space (i.e., polar) coordinates.

Reference is now made to FIGS. 6 through 8 collectively. The hull line segments 228 of the convex hull 220 can be compared (preferably in Hough space) with line segments 212 associated with the feature group 210 of raw feature contours 208. Any of the line segments 212 from the feature group 210 that are not within a certain threshold of similarity to a hull line segment 228 of the convex hull 220 in Hough space coordinates can be discarded to leave a preferred set of lines. It is noted that the majority of the diagonal lines 230 and perpendicular intersecting lines 218 of the feature groups 210 have been removed. Alternatively or additionally, the line segments 212, which can be represented by two end points, can be converted to "infinite" lines, i.e., lines represented in Hough space by coordinates $\rho$ and $\theta$.

Referring collectively to FIGS. 2, 4, and 7, it is noted that in some embodiments, the filtering function 36 may be unnecessary. For example, when the distance from the camera 102 to the ceiling 112 is sufficiently large, it has been discovered by the applicants that the input image 200 may have reduced perspective distortion. Consequently, the perpendicular intersecting lines 218 from the girders between panels may not be detected by the feature extraction function 34 because the perpendicular intersecting lines 218 may appear much shorter than the long "correct" edges in the input image 200.

Referring collectively to FIGS. 2, 4, and 7-9, the process skylights function 30 can comprise a centerline calculating function 38 for selecting two edge lines from each feature group 210 corresponding to a skylight 202 and calculating a centerline 226 from the selected edge lines. Specifically, a first edge line 222 and a second edge line 224 can be selected and utilized to derive the centerline 226 for each skylight 202. After the preferred set of lines 214 has been selected, the highest ranked of the line segments 212 remaining in the preferred set of lines 214 can be selected as the first edge line 222. As the Hough space coordinates of the first edge line 222 can be known, the preferred set of lines 214 can be searched from high rank to low rank to find a second edge line 224 from the line segments 212 with similar enough angle $\theta$ to the first edge line 222. Since in some embodiments the filtering function 36 may be unnecessary, the first edge line 222 and the second edge line 224 can be selected, as described above, directly from the feature group 210 of line segments 212.

In some embodiments, a distance threshold can be utilized to ensure that the second edge line 224 is selected away from the first edge line 222 in Hough space, i.e., to avoid selecting a similar line derived from a duplicate feature. Specifically, applicants have discovered that multiple similar lines can be returned from the Hough transform on a single edge. Accordingly, the highest ranked of the line segments 212 that meets the similarity criteria can be chosen as the second edge line 224.

The centerline 226 can be calculated based upon the first edge line 222 and the second edge line 224. For example, in one embodiment, the centerline 226 can be located by finding a vanishing point 216 where the first edge line 222 and the second edge line 224 converge. A line of bisection can be calculated using the Hough space coordinates of the vanishing point 216, the first edge line 222 and the second edge line 224. The line of bisection can be utilized as the centerline 226. The centerlines 226, which are depicted as being overlaid upon the input image 200 in FIG. 9, can be reported to EBL. Thus, the center line of each of the feature groups can be associated with one of the skylights, and the EBL can be utilized to provide features for navigation of the vehicle or can be presented by a display communicatively coupled to the EBL. It is noted that there are a number of parameters (e.g. thresholds) that can be configured for each function of the CFE algorithm according to the particular site that is being navigated by the vehicle. Accordingly, the embodiments described herein can further include a calibration stage for determining the precise values for the parameters.

It should now be understood that embodiments of the CFE algorithm described herein can be utilized to extract features from objects captured in input images of a ceiling. Thus, objects that can be detected on the ceiling such as, for example, ceiling lights can be utilized to produce features that can be reported to the EBL. The EBL can utilize the reported features from the input image for determining the pose of the vehicle, position of the vehicle, or both. For example, the reported features can include centerlines and point features that can be utilized in conjunction. Accordingly, the pose and position of the vehicle can be utilized as a parameter for navigation, simultaneous localization and mapping (SLAM), or the like.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An industrial vehicle comprising a camera and one or more processors, wherein:
   the camera is communicatively coupled to the one or more processors;
   the camera captures an input image of ceiling lights of the ceiling of the warehouse; and
   the one or more processors execute machine readable instructions to:
      associate raw features of the ceiling lights of the input image with one or more feature groups;
      execute a Hough transform to transform the raw features of the one or more feature groups into line segments associated with the one or more feature groups;
      determine a convex hull of the raw features of the one or more feature groups;
      compare the line segments of the one or more feature groups and the convex hull in Hough space;
      discard the line segments of the one or more feature groups that are outside of a threshold of similarity to the convex hull of the raw features of the one or more feature groups, whereby a preferred set of lines is selected for the one or more feature groups from the line segments of the one or more feature groups;
      determine a centerline of the one or more feature groups from the preferred set of lines;
      associate the centerline of the one or more feature groups with one of the ceiling lights of the input image; and
      navigate the industrial vehicle through the warehouse utilizing the centerline of the one or more feature groups.

2. The industrial vehicle of claim 1, wherein the convex hull comprises hull line segments, and the line segments of the one or more feature groups are compared to the hull line segments.

3. The industrial vehicle of claim 2, wherein the one or more processors execute the machine readable instructions to:
   convert the hull line segments into Hough space coordinates, wherein the hull line segments are infinite lines represented by coordinates $\rho$ and $\theta$.

4. The industrial vehicle of claim 1, wherein the one or more processors execute the machine readable instructions to:
   rank the line segments of the one or more feature groups in order of strength; and
   select a first edge line from the line segments of the preferred set of lines, wherein the first edge line is a highest ranked line of the line segments of the preferred set of lines.

5. The industrial vehicle of claim 4, wherein the first edge line is represented by coordinates $\rho$ and $\theta$.

6. The industrial vehicle of claim 5, wherein the one or more processors execute the machine readable instructions to:
   select a second edge line from the line segments of the preferred set of lines, wherein the second edge line is selected based upon similarity to the $\theta$ of the first edge line.

7. The industrial vehicle of claim 6, wherein the second edge line and the first edge line are separated by a distance threshold.

8. The industrial vehicle of claim 6, wherein the one or more processors execute the machine readable instructions to:
   search the line segments of the preferred set of lines from a high rank to a low rank to select the second edge line.

9. The industrial vehicle of claim 6, wherein the one or more processors execute the machine readable instructions to:
   find a vanishing point where the second edge line and the first edge line converge; and
   calculate a line of bisection of the second edge line and the first edge line, wherein the centerline is calculated based upon the line of bisection.

10. The industrial vehicle of claim 1, wherein each of the one or more feature groups of the raw features are transformed separately into the line segments.

11. The industrial vehicle of claim 1, wherein the input image is underexposed to highlight the ceiling lights.

12. The industrial vehicle of claim 1, wherein the ceiling lights comprise skylights, and the one or more processors execute the machine readable instructions to:
   extract raw feature contours from the skylights, wherein the raw features comprise the raw feature contours;
   classify the raw feature contours as belonging to a skylights class; and
   group the raw feature contours into the one or more feature groups, wherein the one or more feature groups comprises one group per unique skylight of the skylights, and wherein each of the one group comprises the raw feature contours of the unique skylight.

13. The industrial vehicle of claim 12, wherein the ceiling lights comprise round lights and merged lights, and the one or more processors execute the machine readable instructions to:
- extract features from the round lights and the merged lights, wherein the raw features comprise the features from the round lights and the merged lights; and
- classify the features from the round lights and the merged lights into a standard lights class and a merged lights class.

14. The industrial vehicle of claim 12, wherein the raw features comprise unwanted features, and the one or more processors execute the machine readable instructions to:
- classify the unwanted features as noise.

15. The industrial vehicle of claim 12, wherein the raw feature contours are grouped into the one or more feature groups based upon relative proximity, and the one or more processors execute the machine readable instructions to:
- calculate a minimum bounding rectangle for each of the raw feature contours; and
- calculate the relative proximity based upon inter-feature distances of the minimum bounding rectangle for each of the raw feature contours.

16. An industrial vehicle comprising a camera and one or more processors, wherein:
- the camera is communicatively coupled to the one or more processors;
- the camera is mounted to the industrial vehicle and focused to a ceiling of a warehouse;
- the camera captures an input image of a skylight of the ceiling of the warehouse; and
- the one or more processors execute machine readable instructions to:
  - extract raw feature contours from the skylight of the input image of the ceiling;
  - group the raw feature contours into a feature group;
  - execute a Hough transform to transform the raw feature contours of the feature group into line segments associated with the feature group;
  - determine a convex hull of the raw feature contours of the feature group;
  - compare the line segments of the feature group and the convex hull in Hough space;
  - discard the line segments of the feature group that are outside of a threshold of similarity to the convex hull of the raw feature contours of the feature group, whereby a preferred set of lines is selected for the feature group from the line segments of the feature group;
  - determine a centerline of the feature group from the preferred set of lines of the feature group;
  - determine a pose of the industrial vehicle, a position of the industrial vehicle, or both based upon the centerline; and
  - navigate the industrial vehicle through the warehouse utilizing the pose, the position, or both.

17. The industrial vehicle of claim 16, wherein the input image comprises round lights and merged lights, and the one or more processors execute the machine readable instructions to:
- extract features from the round lights and the merged lights of the input image;
- extract unwanted features from the input image;
- classify the features from the round lights and the merged lights into a standard lights class and a merged lights class; and
- classify the unwanted features as noise.

18. The industrial vehicle of claim 16, wherein a distance threshold is utilized to group the raw feature contours into the feature group based upon relative proximity.

19. The industrial vehicle of claim 18, wherein the one or more processors execute the machine readable instructions to:
- calculate a minimum bounding rectangle for each of the raw feature contours; and
- calculate the relative proximity based upon inter-feature distances of the minimum bounding rectangle for each of the raw feature contours.

20. A method for navigating an industrial vehicle comprising:
- capturing an input image of a skylight and a substantially circular light of a ceiling of a warehouse, wherein the input image is captured with a camera coupled to an industrial vehicle;
- extracting raw features from the skylight of the input image;
- determining a convex hull of the raw features automatically, with one or more processors;
- selecting a preferred set of lines from the raw features utilizing the convex hull of the raw features;
- transforming the substantially circular light of the input image automatically, with the one or more processors, into a point feature;
- determining a centerline of the skylight from the preferred set of lines;
- determining a pose of the industrial vehicle, a position of the industrial vehicle, or both based upon the centerline and the point feature; and
- navigating the industrial vehicle through the warehouse utilizing the pose, the position, or both.

* * * * *